United States Patent
Zhu et al.

(10) Patent No.: US 12,289,643 B2
(45) Date of Patent: Apr. 29, 2025

(54) TECHNIQUES FOR MAINTAINING MULTICAST AND/OR BROADCAST SERVICE WIRELESS COMMUNICATIONS

(71) Applicant: QUALCOMM Incorporated, San Diego, CA (US)

(72) Inventors: Xipeng Zhu, San Diego, CA (US); Prasad Reddy Kadiri, San Diego, CA (US); Umesh Phuyal, San Diego, CA (US); Miguel Griot, La Jolla, CA (US); Haris Zisimopoulos, London (GB); Xiaoxia Zhang, San Diego, CA (US); Alberto Rico Alvarino, San Diego, CA (US); Le Liu, San Jose, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/788,252

(22) PCT Filed: Jan. 21, 2021

(86) PCT No.: PCT/US2021/014434
§ 371 (c)(1),
(2) Date: Jun. 22, 2022

(87) PCT Pub. No.: WO2021/150766
PCT Pub. Date: Jul. 29, 2021

(65) Prior Publication Data
US 2023/0027425 A1 Jan. 26, 2023

(30) Foreign Application Priority Data

Jan. 24, 2020 (GR) .............................. 20200100033

(51) Int. Cl.
*H04W 36/00* (2009.01)
*H04W 36/08* (2009.01)
*H04W 76/30* (2018.01)

(52) U.S. Cl.
CPC ... *H04W 36/0007* (2018.08); *H04W 36/0085* (2018.08); *H04W 76/30* (2018.02)

(58) Field of Classification Search
CPC ............ H04W 36/0007; H04W 76/30; H04W 36/0085
See application file for complete search history.

(56) References Cited

U.S. PATENT DOCUMENTS 10,277,416 B2  4/2019 Zhu
2009/0303914 A1  12/2009 Gonsa et al.
(Continued)

FOREIGN PATENT DOCUMENTS

CN 101675671 A 3/2010
CN 107210897 A 9/2017

OTHER PUBLICATIONS

International Search Report issued in corresponding International Application No. PCT/US2021/014434 dated May 7, 2021.

*Primary Examiner* — Derrick V Rose
(74) *Attorney, Agent, or Firm* — Arent Fox, LLP

(57) ABSTRACT

Aspects described herein relate to communicating with one or more cells for receiving a multicast and/or broadcast service (MBS), and providing MBS continuity in device mobility scenarios. In an aspect, one or more cells for reselection from a current cell can be detected, where the current cell supports a UE interested MBS. The one or more cells can be evaluated for reselection based at least in part on whether the one or more cells support the UE interested MBS to determine a target cell for reselection. Cell reselection can be performed to the target cell.

30 Claims, 7 Drawing Sheets

(56) References Cited

U.S. PATENT DOCUMENTS

| | | | |
|---|---|---|---|
| 2014/0036676 A1* | 2/2014 | Purnadi | H04W 36/0058 |
| | | | 370/235 |
| 2014/0204829 A1 | 7/2014 | Wang et al. | |
| 2015/0043533 A1* | 2/2015 | Kim | H04W 48/20 |
| | | | 370/331 |
| 2015/0131613 A1* | 5/2015 | Jung | H04W 24/10 |
| | | | 370/331 |
| 2016/0381517 A1* | 12/2016 | Kim | H04W 76/10 |
| | | | 370/331 |
| 2018/0035340 A1 | 2/2018 | Fujishiro et al. | |
| 2018/0160436 A1* | 6/2018 | Park | H04W 76/14 |
| 2018/0352508 A1* | 12/2018 | Fujishiro | H04W 76/10 |

* cited by examiner

1

TECHNIQUES FOR MAINTAINING MULTICAST AND/OR BROADCAST SERVICE WIRELESS COMMUNICATIONS

CROSS REFERENCE TO RELATED APPLICATION(S)

This application is a 35 U.S.C. § 371 National Phase of PCT Application No. PCT/US2021/014434, entitled "TECHNIQUES FOR MAINTAINING MULTICAST BROADCAST SERVICE WIRELESS COMMUNICATIONS" filed Jan. 21, 2021, which claims priority to Greek Patent Application No. 20200100033, entitled "TECHNIQUES FOR MAINTAINING MULTICAST BROADCAST SERVICE WIRELESS COMMUNICATIONS" and filed on Jan. 24, 2020, which is assigned to the assignee hereof and hereby expressly incorporated by reference herein for all purposes.

BACKGROUND

Aspects of the present disclosure relate generally to wireless communication systems, and more particularly, to multicast and/or broadcast service (MBS) communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G, MBSs are available to provide high throughput broadcast communications to various devices via a base station. A device may communicate with a base station in a connected mode (an RRC_CONNECTED mode as defined in the radio resource control (RRC) protocol for 5G) where the device continues to receive resources grants and associated communications with the base station. The device may communicate with the base station in an idle or inactive mode (RRC_IDLE or RRC_INACTIVE as defined in the RRC protocol for 5G) where the device can suspend power to communication resources and can periodically power on the communication resources to possibly determine to switch to the connected mode.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes detecting one or more cells for reselection from a current cell, wherein the current cell supports a UE interested multicast and/or broadcast service (MBS), evaluating the one or more cells for reselection based at least in part on whether the one or more cells support the UE interested MBS to determine a target cell for reselection, and performing cell reselection to the target cell.

In another example, a method for wireless communications is provided. The method includes receiving, from a user equipment (UE), information regarding a UE interested MBS, determining one or more neighboring cells offering the UE interested MBS, and transmitting, to the UE, an indication of the one or more neighboring cells.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an aspect, an apparatus for wireless communication is provided that includes a transceiver, a memory configured to store instructions, and one or more processors communicatively coupled with the memory and the transceiver. The one or more processors are configured to detect one or more cells for reselection from a current cell, wherein the current cell supports a UE interested MBS, evaluate the one or more cells for reselection based at least in part on whether the one or more cells support the UE interested MBS to determine a target cell for reselection; and perform cell reselection to the target cell.

In another aspect, an apparatus for wireless communication is provided that includes a transceiver, a memory configured to store instructions, and one or more processors communicatively coupled with the memory and the transceiver. The one or more processors are configured to receive, from a UE, information regarding a UE interested MBS, determine one or more neighboring cells offering the UE interested MBS, and transmit, to the UE, an indication of the one or more neighboring cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
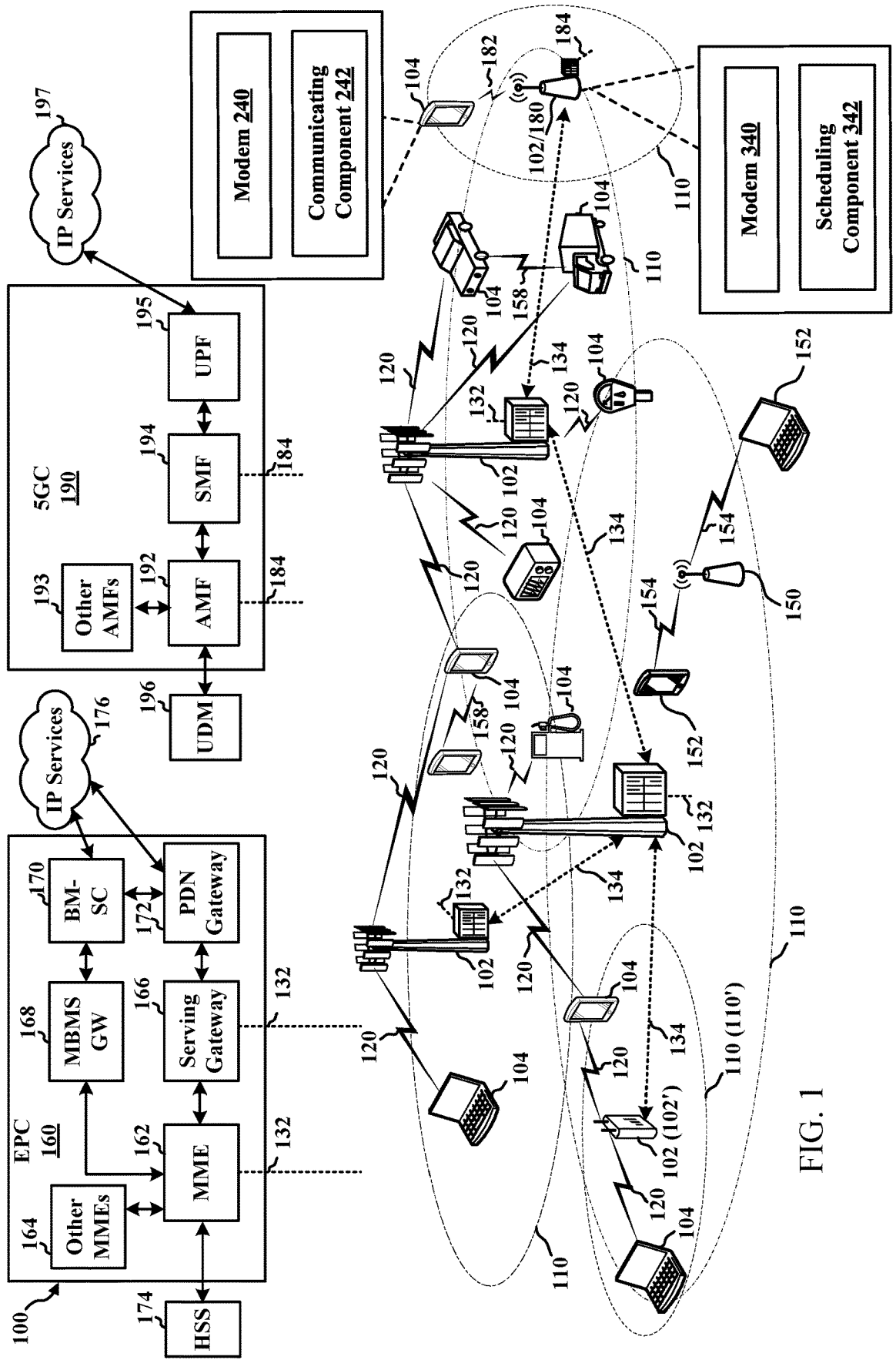
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to mechanisms for providing service continuity for multicast and/or broadcast service (MBS). A device in a mobility scenario that moves communications from one cell to another can retain MBS communications with the next cell. In an aspect, a device (e.g., user equipment (UE)) communicating with one or more cells, where at least one of the one or more cells provides a MBS, can determine one or more other cells that support the MBS communications for performing reselection to the one or more other cells. For example, the device can determine whether a target cell supports a certain MBS, and if so can perform reselection to the target cell, which may be based on other triggers or considerations as well, such as signal strength or quality of signals from the target cell, such as signal strength or quality of signals from the current cell, etc. In an example, the certain MBS can be referred to as a UE interested MBS, as the MBS can be a service the UE is interested in receiving, which can be specified by a user of the UE, determined based on a MBS the UE is currently receiving, determined based on a stored configuration in the UE, etc.

In wireless communication technologies such as fourth generation (4G) long term evolution (LTE), enhanced multimedia broadcast multicast service (eMBMS)/single cell point to multipoint (SC-PTM) may support UE based service continuity in radio resource control (RRC)_CONNECTED state (e.g., using MBMSInterestIndication) and RRC_IDLE state. UE assisted radio access network (RAN) based lossless/seamless handover, however, can be applicable in 4G only for unicast dedicated radio bearers (DRBs) and not necessarily multicast radio bearers (MRBs). In wireless communication technologies such as 5G, however, MBS can support UE based service continuity (e.g., where network based mobility may not be available), such as at least for a UE receiving MBS in RRC_IDLE/INACTIVE from serving or non-serving cell, and/or UE in RRC_CONNECTED being handed-over to a cell not supporting UE desired MBS. In one example, a MBS application of the core network can notify access stratum (AS) of the desired MBS (e.g., identified via temporary mobile group identity (TMGI), multicast and/or broadcast (MB) flow identifier, MBS-Session identifier, etc.) for MBS-aware mobility. In one example, a UE can perform MBS-aware cell reselection (e.g., where the UE operates in RRC_IDLE or RRC_INACTIVE mode). In another example, a MBS bearer can be stopped/suspended and a MBS application can request to establish a unicast connection to the MBS application server. In aspects described herein, MBS continuity can be provided for a device in performing cell reselection, which can provide a seamless user experience as a UE moves communications between cells. In particular, the MBS continuity can be provided for a UE in RRC_IDLE or RRC_INACTIVE mode, such that where the UE moves to a cell and eventually transitions to a RRC_CONNECTED state, the MBS can be available and used via the current cell.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating with a base station 102 to receive a MBS, and some nodes may have a modem 340 and scheduling component 342 for scheduling devices to receive MBS communications, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast and/or broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can provide one or more MBSs over certain resources, and/or can provide information regarding the resources (e.g., time and frequency resources) over which the MBSs are provided. Communicating component 242 can receive the MBS from the base station 102 in a serving cell or non-serving cell provided by the base station 102. In an aspect, communicating component 242 can operate in an idle or inactive mode but with a desire to receive a MBS, which can be referred to herein as a UE interested MBS. Communicating component 242 can accordingly attempt to ensure continuity for the UE interested MB S when performing reselection among cells. For example communicating component 242 can determine whether prospective cells support the UE interested MBS in considering the cells for reselection. In addition, in an example, scheduling component 342 of a current cell can provide the UE 104 with information regarding target cells that support the UE interested MBS.

Figure 2:
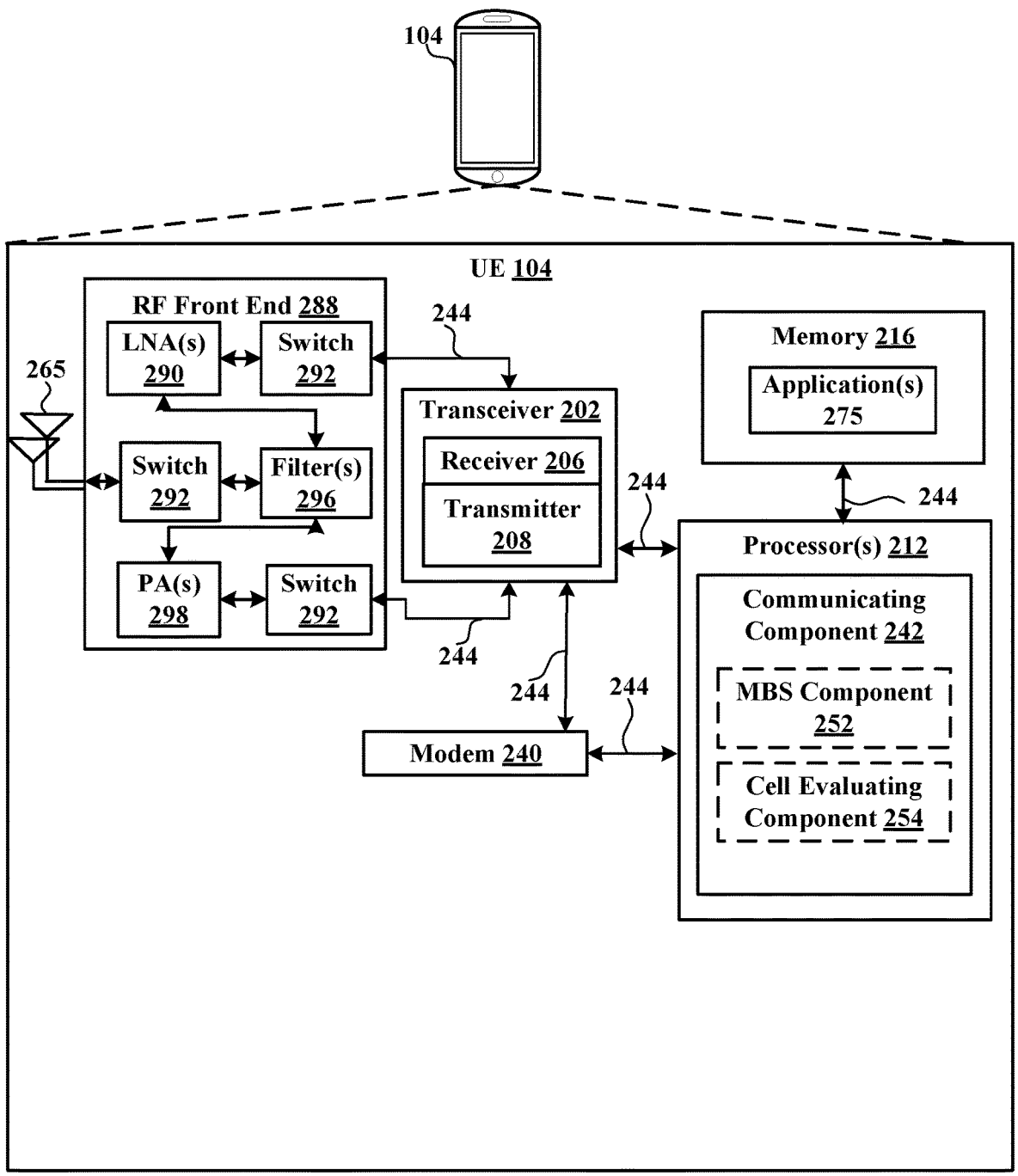
FIG. 2 is a block diagram illustrating an example of a UE, in accordance with various aspects of the present disclosure.
Figure 3:
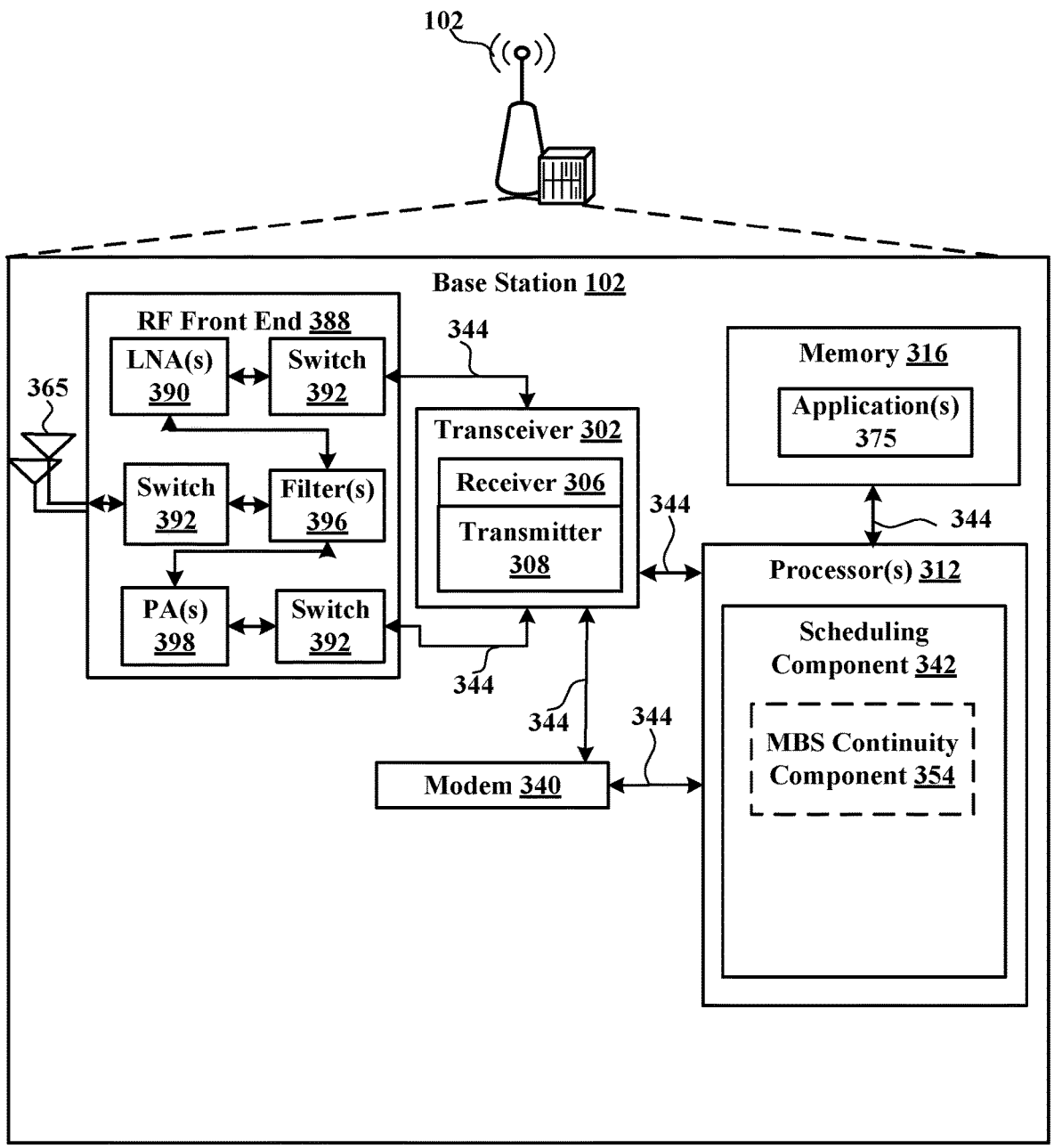
FIG. 3 is a block diagram illustrating an example of a base station, in accordance with various aspects of the present disclosure.
Figure 4:
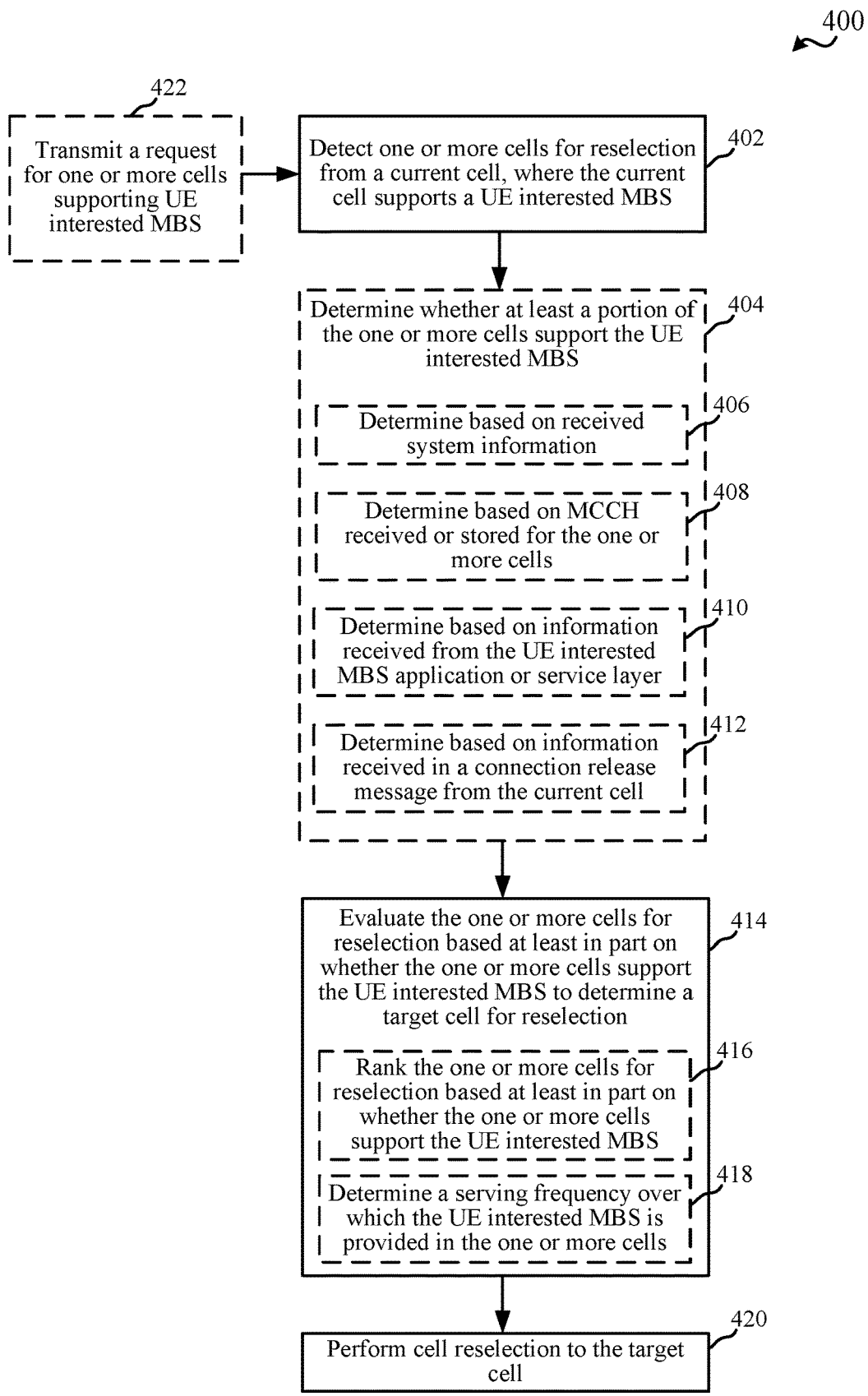
FIG. 4 is a flow chart illustrating an example of a method for providing MBS continuity in UE mobility, in accordance with various aspects of the present disclosure.
Figure 5:
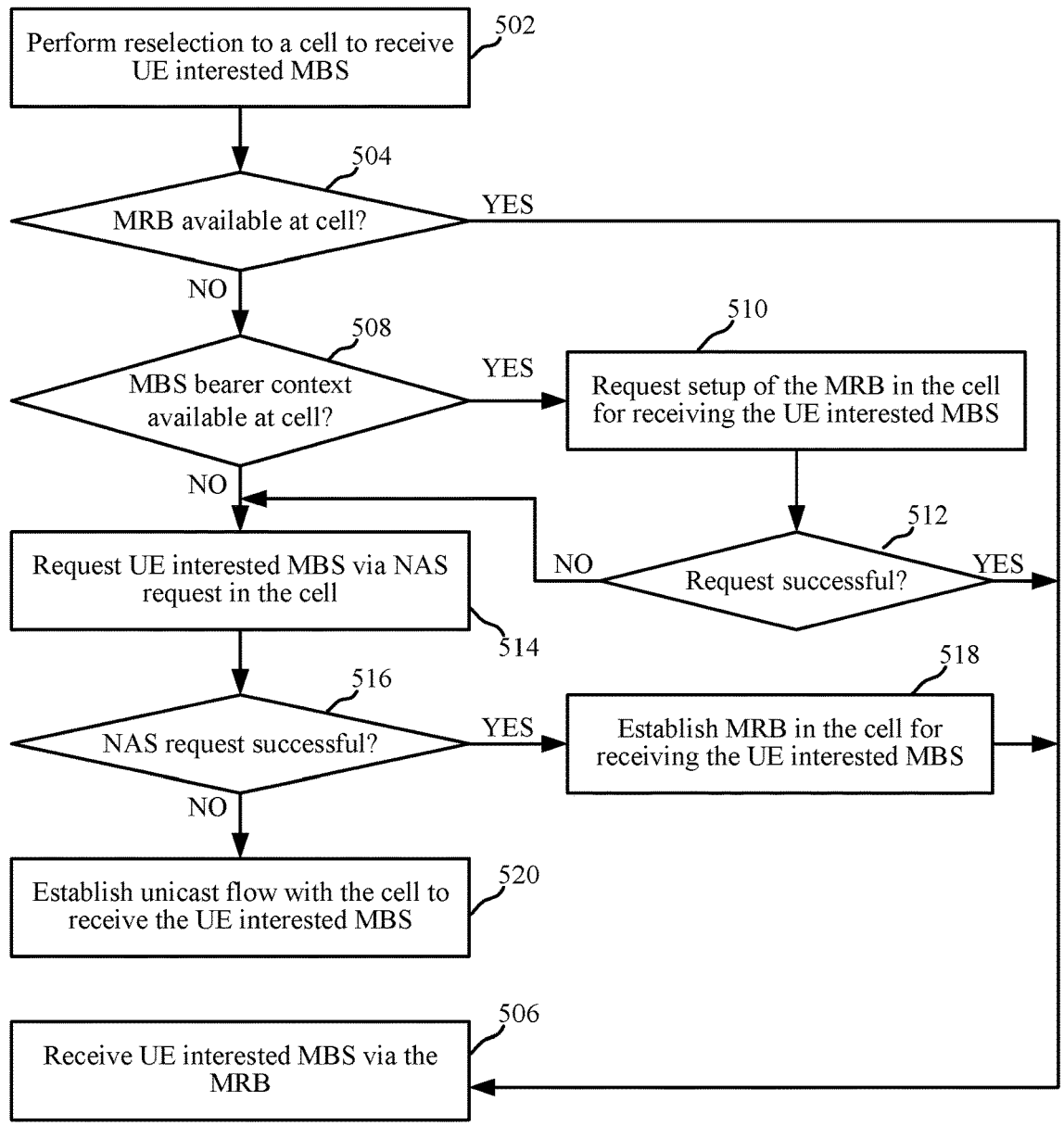
FIG. 5 is a flow chart illustrating an example of a method for establishing MBS after cell reselection, in accordance with various aspects of the present disclosure.
Figure 6:
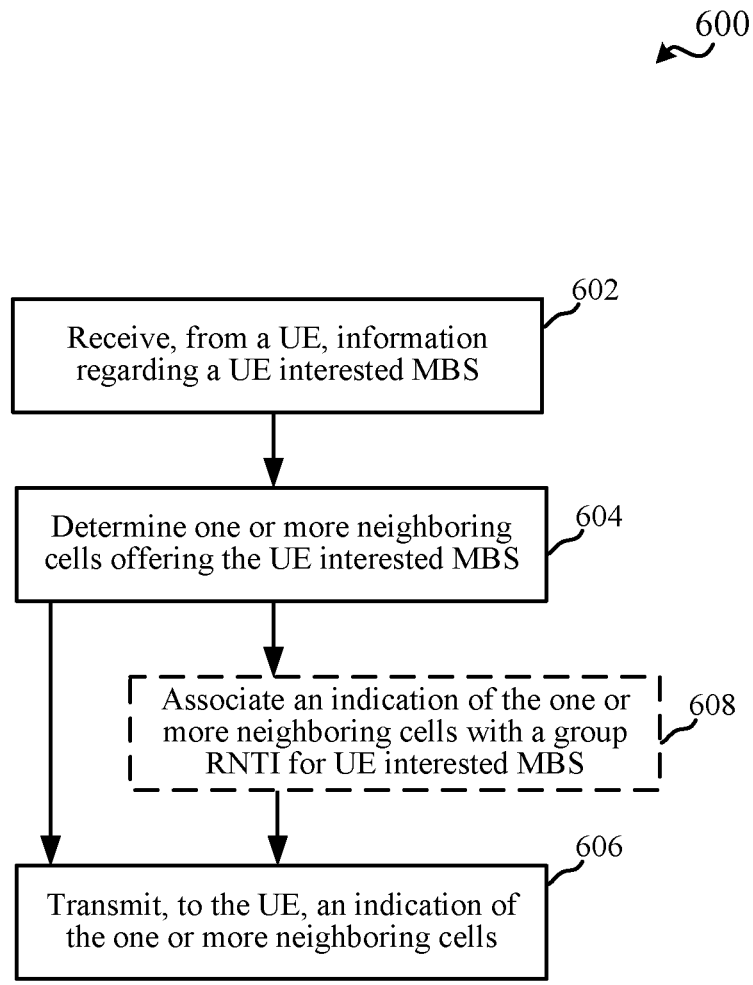
FIG. 6 is a flow chart illustrating an example of a method for providing MBS assistance information to facilitate cell reselection, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating with a base station 102 to receive a MBS, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a MBS component 252 for receiving a MBS from a serving cell or non-serving cell and/or determining cells that support the UE interested MBS, and/or a cell evaluating component 254 for evaluating one or more cells as target cells for reselection based on whether the one or more cells support the UE interested MBS, as described further herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling devices to receive MBS communications, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a MBS continuity component 354 for facilitating MBS continuity in mobility scenarios for the one or more UEs, as described further herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for receiving a MBS. In an example, a UE 104 can perform the functions described in method 400 using one or more of the components described in FIGS. 1-2. In an example, MBS component 252 of the UE 104 can receive MBS communications from a current cell, and can move to a RRC_IDLE or RRC_INACTIVE mode with the current cell. In the RRC_IDLE or RRC_INACTIVE mode, for example, the MBS communications may be suspended with the current cell, and the UE 104 can conserve radio resources by removing or reducing power (e.g., sleeping) to the radio resources during certain periods of time, while restoring power (e.g., waking) to the radio resources in other periods of time to potentially receive paging or other signals from the current cell.

In method 400, at Block 402, the UE can detect one or more cells for reselection from a current cell. In an aspect, cell evaluating component 254, e.g., in conjunction with processor(s) 212, memory 216, transceiver 202, communicating component 242, etc., can detect the one or more cells for reselection. In an example, cell evaluating component 254 can detect the one or more cells for possible reselection from a current cell. For example, cell evaluating component 254 can detect the one or more cells while in idle or inactive mode with the current cell, as described above. For example, cell evaluating component 254 may determine to detect the one or more cells based on one or more events or triggers, which may correspond to cell reselection. For example, events/triggers defined for cell reselection may include a periodicity for measuring cells or other events/triggers indicated in a measurement configuration to cause performing measurements of signals from other cells for possible reselection, determining a signal strength or quality of signals from the current cell does not achieve a threshold, etc.

In method 400, optionally at Block 404, the UE can determine whether at least a portion of the one or more cells support the UE interested MBS. In an aspect, MBS component 252, e.g., in conjunction with processor(s) 212, memory 216, transceiver 202, communicating component 242, etc., can determine whether at least the portion of the one or more cells detected for possible reselection support the UE interested MBS. For example, this information may be used in determining whether to perform cell reselection from the current cell to a target cell of the one or more cells, as described further herein.

In determining whether at least the portion of the one or more cells support the UE interested MBS at Block 404, optionally at Block 406, the UE can determine this based on received system information. In an aspect, MBS component 252, e.g., in conjunction with processor(s) 212, memory 216, transceiver 202, communicating component 242, etc., can determine whether at least the portion of the one or more cells support the UE interested MBS based on received system information. In an example, each cell of the one or more cells can broadcast system information indicating whether MBS is supported by the cell. In another example, one or more of the cells can broadcast a list of one or more MBSs supported by the one or more cells, or other information related to supported MBSs (e.g., one or more identifiers, frequencies, numerology, bandwidths, etc.). For example, the system information from each cell may indicate MB-flow/TMGI/MB-Session ID/MB service area identifier (SAI) list for different frequencies (e.g., intra-frequency and inter-frequency). In another example, the system information from each cell may indicate MB-flow/TMGI/MB-Session ID/MB service area identifier (SAI) list for the cell. In any case, for example, MBS component 252 can receive and process the system information to determine which cells, frequencies, etc. support the UE interested MBS.

In yet another example, one cell (e.g., the current cell or one of the one or more cells detected for possible reselection) may broadcast, and MBS component 252 may receive, system information indicating MBS information for each neighbor cell. In another example, for a cell with the TMGI/MB-flow/MB-Session ID/MB SAI of the UE interested MBS, the cell may indicate MRB status: active or inactive (MB-flow over DRB). MBS component 252 can use this additional information to determine whether the cell supports the UE interested MBS and/or otherwise whether to perform reselection to the cell based on the additional information.

In another example, in determining whether at least the portion of the one or more cells support the UE interested MBS at Block 404, optionally at Block 408, the UE can determine this based on a multicast control channel (MCCH)

received or stored for the one or more cells. In an aspect, MBS component 252, e.g., in conjunction with processor(s) 212, memory 216, transceiver 202, communicating component 242, etc., can determine whether at least the portion of the one or more cells support the UE interested MBS based on MCCH received or stored for the one or more cells. For example, MBS component 252 may have previously received MCCH (and stored or cached in memory 216) from the one or more cells (e.g., in previously communicating therewith). In another example, MBS component 252 can receive the MCCH (e.g., multicast and/or broadcast (MB)-MCCH) as part of detecting the one or more cells. In an example, the MCCH may include one or more indicators specifying MBS supported by the cell. For example, the one or more indicators may include a TMGI/MB-flow/MB-Session ID/MB SAI of the UE interested MBS. In addition, for example, for a cell with the TMGI/MB-flow/MB-Session ID/MB SAI of the UE interested MBS, the cell may indicate MRB status: active or inactive (MB-flow over DRB). In either case, the MCCH may indicate the MBS information.

In one example, a dedicated group radio network temporary identifier (G-RNTI)/MCCH may be used for UE 104 to receive MBS configuration of neighbor cells. For example, MBS component 252 can monitor a search space for the MCCH based on the G-RNTI. In one example, the MCCH can be scrambled with the G-RNTI to allow the UE 104 to detect and process the MCCH to determine whether the corresponding MBS information corresponds to the UE interested MBS. In this regard, for example, the G-RNTI can be used to associate MBS information with a certain UE interested MBS, and the MBS information can indicate one or more cells or frequencies that support the associated MBS.

In another example, in determining whether at least the portion of the one or more cells support the UE interested MBS at Block 404, optionally at Block 410, the UE can determine this based on information received from the UE interested MBS application or service layer. In an aspect, MBS component 252, e.g., in conjunction with processor(s) 212, memory 216, transceiver 202, communicating component 242, etc., can determine whether at least the portion of the one or more cells support the UE interested MBS based on information received from the UE interested MBS application or service layer. For example, MBS component 252 can receive the MBS in the current cell at the MBS application or service layer. In MBS application or service layer communications with the current cell, MBS component 252 can receive the information regarding MBS offered at one or more cells during this time (e.g., based on requesting the information via the MBS application or service, based on determining to enter an idle or inactive mode, etc.). In one example, MBS component 252 can determine the service availability information of other cells based on associated information received from a broadcast multicast service center (BM-SC), multicast/broadcast service function (MSF), etc., or any application layer server, using MBS application or service layer communications.

In another example, in determining whether at least the portion of the one or more cells support the UE interested MBS at Block 404, optionally at Block 412, the UE can determine this based on information received in a connection release message from the current cell. In an aspect, MBS component 252, e.g., in conjunction with processor(s) 212, memory 216, transceiver 202, communicating component 242, etc., can determine whether at least the portion of the one or more cells support the UE interested MBS based on information received in a connection release message (e.g., RRCConnectionRelease) from the current cell. For example, when releasing the connection so the UE 104 can move to RRC_IDLE or RRC_INACTIVE state, the base station 102 of the current cell can indicate the MBS information for neighboring cells or frequencies. For example, the connection release message may include one or more parameters identifying MBS offered by neighboring cells and/or on corresponding frequencies, and MBS component 252 may use this information in determining a cell for possible reselection.

In method 400, at Block 414, the UE can evaluate the one or more cells for reselection based at least in part on whether the one or more cells support the UE interested MBS to determine a target cell for reselection. In an aspect, cell evaluating component 254, e.g., in conjunction with processor(s) 212, memory 216, transceiver 202, communicating component 242, etc., can evaluate the one or more cells for reselection based at least in part on whether the one or more cells support the UE interested MBS to determine the target cell for reselection. For example, cell evaluating component 254 can use an indication of whether the one or more cells support the UE interested MBS as a criteria in determining a target cell for reselection. For example, cell evaluating component 254 can determine the target cell as a cell with a highest signal strength/quality measurement that also supports the UE interested MBS. In another example, described further herein, the UE can consider additional factors of the cells as well in determining the target cell.

In evaluating the one or more cells at Block 414, optionally at Block 416, the UE can rank the one or more cells for reselection based at least in part on whether the one or more cells support the UE interested MBS. In an aspect, cell evaluating component 254, e.g., in conjunction with processor(s) 212, memory 216, transceiver 202, communicating component 242, etc., can rank the one or more cells for reselection based at least in part on whether the one or more cells support the UE interested MBS. For example, cell evaluating component 254 can use the indication of whether the cell supports the UE interested MBS as one bias in ranking the cells, and can also consider cell signal strength/quality, a hysteresis parameter to prevent multiple cell reselections in a short period of time, etc. For example, cell evaluating component 254 can measure synchronization signal blocks (SSBs) of the one or more cells to determine a signal strength and/or quality thereof. In any case, UE 104 can consider the ranking of the cells in determining a cell for reselection (e.g., UE 104 can attempt reselection to a highest ranked cell first, and then a second highest ranked cell, etc., until cell reselection is completed).

For example, for MB-quality of service (QoS) (allocation and retention priority (ARP), 5G QoS indicator (5QI) or new parameter), a specific bias Qoffset$_{mbs}$ (e.g., RSRP/reference signal received quality (RSRQ)/signal-to-interference-and-noise ratio (SINR), etc.) can be used for ranking based intra-frequency idle cell reselection.

$$R_s = Q_{meas,s} + Q_{hyst} - Q\text{offset}_{temp} + Q\text{offset}_{mbs}$$

$$R_n = Q_{meas,n} - Q\text{offset} - Q\text{offset}_{temp} + Q\text{offset}_{mbs}$$

where $R_s$ is the rank of the serving cell, $R_n$ is the rank of a neighbor cell, $Q_{meas,s}$ is the radio quality (e.g., signal strength or quality) of the serving cell, $Q_{meas,n}$ is the radio quality (e.g., signal strength or quality) of the neighbor cell, $Q_{hyst}$ is a radio quality hysteresis for cell reselection, and Qoffset$_{temp}$ is a temporary radio quality offset (e.g., as defined in 3GPP TS 38.304). In a specific example, cell evaluating component 254 can apply Qoffset$_{mbs}$ bias when UE is receiving or interested to receive an MBS (the UE interested MBS) and can only receive this MBS service while camping on a frequency on which it is provided (MBS frequency). For example, cell evaluating component 254 can consider Qoffset$_{mbs}$ to be valid during the MBS session. In addition, for example, cell evaluating component 254 can search for a higher ranked cell on another frequency for cell reselection as soon as possible after the UE stops using Qoffset$_{mbs}$. In an example, cell evaluating component 254 can determine TMGI/MB-flow/MB SAI/MB-Session ID specific bias as configured as part of MBS bearer context or MRB configuration. In addition, for example, cell evaluating component 254 can consider relative priority between unicast services (DRBs) and broadcast services (MRBs) in evaluating the cells for reselection.

In evaluating the one or more cells at Block 414, optionally at Block 418, the UE can determine a serving frequency over which the UE interested MBS is provided in the one or more cells. In an aspect, cell evaluating component 254, e.g., in conjunction with processor(s) 212, memory 216, transceiver 202, communicating component 242, etc., can determine the serving frequency over which the UE interested MBS is provided in the one or more cells. For example, cell evaluating component 254 can determine the serving frequency over which the UE interested MBS is provided in the one or more cells based on the MBS information received for the one or more cells (e.g., in system information, MCCH, from MBS application or service layer, in a connection release message, etc., as described above in reference to Block 404).

In a specific example, cell evaluating component 254 can prioritize idle cell reselection for MBS continuity. For example, MBS component 252 can determine frequency, TMGI/MBMS SAI/MBS-Session ID/QoS Flow ID, etc. combinations from system information (e.g., in a new SIBx) received from one or more cells that provides the UE interested MBS service from user service description (USD). As part of cell reselection (or cell selection), cell evaluating component 254 can determine which frequency(ies) provide(s) UE interested MBS(s) based on the one or more of the frequency, TMGI/MBMS SAI/MBS-Session ID/QoS Flow ID, etc. Cell evaluating component 254 may prioritize the frequency(ies) providing the UE interested MBS(s) in evaluating cells for reselection.

In one specific example, where the UE 104 operates in an idle mode on a cell in Frequency F1, the UE 104 can receive the frequency, TMGI/MBMS SAI/MBS Session ID/QoS Flow ID List combinations from SIBx (e.g., Frequency F1, MBS SAI/Flow ID/TMGI/MBS Session ID List: 1, 2, and 3, Frequency F2, MBS SAI/Flow ID/TMGI/MBS Session ID List: 4 and 5). In this example, the UE 104 can select MBS 4 from USD as the UE interested MBS. The UE 104 can read SIBx from gNB 1 on Frequency F1. From SIBx, the UE 104 can determine that gNB 2, F2 provides MBS 4. Accordingly, during idle cell reselection, the UE 104 can move (e.g., perform idle mode cell reselection) from gNB1 F1 to gNB2 F2 to receive the UE interested MBS 4.

In method 400, at Block 420, the UE can perform cell reselection to the target cell. In an aspect, communicating component 242, e.g., in conjunction with processor(s) 212, memory 216, transceiver 202, etc., can perform cell reselection to the target cell, which can be based on identifying the target cell, based on one or more other triggers/events (e.g., regarding signal strength or quality at the current cell or the target cell), etc. For example, the cell reselection may include a cell selection or reselection, and/or may be performed in idle or inactive mode, etc. In any case, where communicating component 242 reselects a cell that supports the UE interested MBS, the UE 104 can receive the MBS from the target cell following cell reselection. In one example, UE 104 can receive the MBS from the target cell when transitioning from the idle or inactive mode to a connected mode in the target cell.

In another example, in method 400, optionally at Block 422, the UE can transmit a request for one or more cells supporting the UE interested MBS. In an aspect, MBS component 252, e.g., in conjunction with processor(s) 212, memory 216, transceiver 202, communicating component 242, etc., can transmit (e.g., to the current cell) the request for one or more cells supporting the UE interested MBS. For example, the current cell may respond with information regarding cells that provide the UE interested MBS, as described above. For example, the UE 104 may query gNB for cell and frequency supporting its desired MBS service following on-demand SIB/MCCH procedure.

For example, the UE 104 can send the information of its desired MB-flow/TMGI/MB-Session ID/MB SAI in a random access channel (RACH) procedure message (e.g., MsgA in a two-step RACH, Msg1 in a four-step RACH, etc.). In this example, gNB can send the recommended cell(s) information in MCCH or new SIB or in another RACH procedure message (e.g., MsgB in the two-step RACH, Msg2 in the four-step RACH, etc.). In addition, for example, a dedicated group radio network temporary identifier (G-RNTI)/MCCH may be used for UE 104 to receive MBS configuration of neighbor cells. In an example, the UE 104, however, can make final decision of target cell based on MBS availability and measurement to neighbor cells, as described above.

FIG. 5 illustrates a flow chart of an example of a method 500 for receiving a MBS after performing reselection. In an example, a UE 104 can perform the functions described in method 500 using one or more of the components described in FIGS. 1-2. For example, when the UE 104 enters a new cell by either cell reselection/selection or handover, the UE 104 can attempt to continue the MBS, as described below.

In method 500, at Block 502, the UE can perform reselection to a cell to receive a UE interested MBS. In an aspect, communicating component 242, e.g., in conjunction with processor(s) 212, memory 216, transceiver 202, etc., can perform cell reselection to the cell to receive the UE interested MBS. For example, this can be similar to performing cell reselection to the target cell as described in Block 420 of method 400 (FIG. 4), which can be based on determining cells for reselection based on the various considerations described in the example of method 400 (FIG. 4).

In method 500, at Block 504, the UE can determine whether a MRB is available at the cell. In an aspect, MBS component 252, e.g., in conjunction with processor(s) 212, memory 216, transceiver 202, communicating component 242, etc., can determine whether the MRB (e.g., corresponding to the UE interested MBS) is available at the cell. In an example, MBS component 252 can determine whether the MRB is available based at least in part on MCCH or system information received from the cell that has been reselected. Where the MRB is available at Block 504, at Block 506 the UE can receive the UE interested MBS via the MRB. In an aspect, MBS component 252, e.g., in conjunction with processor(s) 212, memory 216, transceiver 202, communicating component 242, etc., can receive the UE interested MBS via the MRB.

Where the MRB is not available at Block 504, at Block 508 the UE can determine whether a MBS bearer context is available at the cell. In an aspect, MBS component 252, e.g., in conjunction with processor(s) 212, memory 216, transceiver 202, communicating component 242, etc., can determine whether the MBS bearer context is available at the cell. For example, MBS component 252 can check whether MBS bearer context for the MB-flow or TMGI is configured in the cell. For example, the MBS bearer context can be established by core network in RAN, including N3-tunnel, QoS profile etc. information. In addition, for example, the MBS bearer context may be carried over either DRB or MRB. In an aspect, MB S component 252 can determine whether the MB S bearer context is available by querying the core network via the cell.

Where the MBS bearer context is available at Block 508, at Block 510, the UE can request setup of the MRB in the cell for receiving the UE interested MBS. In an aspect, MBS component 252, e.g., in conjunction with processor(s) 212, memory 216, transceiver 202, communicating component 242, etc., can request setup of the MRB in the cell for receiving the UE interested MBS. For example, if MBS bearer context is available, MBS component 252 may request MRB setup by RRC signaling to the cell, by indicating the request in a media access control (MAC) control element (CE), etc. At Block 512, the UE can determine whether the request to setup the MRB is successful. In an aspect, MBS component 252, e.g., in conjunction with processor(s) 212, memory 216, transceiver 202, communicating component 242, etc., can determine whether the request is successful. In an example, MBS component 252 can determine whether the request is successful (or not successful) based on receiving (or not receiving within a period of time) instructions or parameters for establishing the MRB in the cell. If the request is successful, at Block 506, the UE interested MBS can be received via the MRB.

Where the MBS bearer context is not available at Block 508, or where the request to setup the MRB is unsuccessful at Block 512, at Block 514, the UE can request the UE interested MBS via NAS request in the cell. In an aspect, MBS component 252, e.g., in conjunction with processor(s) 212, memory 216, transceiver 202, communicating component 242, etc., can request the UE interested MBS via NAS request in the cell. For example, MBS component 252 can transmit a Service Request or protocol data unit (PDU) Session Establishment Request related to the MB S in a NAS layer communication via the cell. Where the NAS request is successful at Block 516, at Block 518, the UE can establish the MRB in the cell for receiving the UE interested MBS, and at Block 506, the UE can receive the UE interested MBS via the MRB. In an aspect, MBS component 252, e.g., in conjunction with processor(s) 212, memory 216, transceiver 202, communicating component 242, etc., can establish the MRB in the cell for receiving the UE interested MBS and can receive the UE interested MBS via the MRB.

Where the NAS request is not successful at Block 516, at Block 520, the UE can establish a unicast flow with the cell to receive the UE interested MBS. In an aspect, MBS component 252, e.g., in conjunction with processor(s) 212, memory 216, transceiver 202, communicating component 242, etc., can establish the unicast flow (e.g., over a DRB) with the cell to receive the UE interested MBS. For example, the UE 104 can continue the MBS by unicast by, e.g. in group communication service (GCS), sending session initiation protocol (SIP) signaling to GCS Server for GCS service to establish unicast QoS flow for the MBS. In one specific example, the AS of the UE 104 can notify the MBS application executing on the UE 104 (e.g., in applications 275) that the TMGI/MB-flow/MB-Session ID is being suspended/stopped, and the MBS application can request NAS to establish the unicast connection to the MBS application server via the cell.

FIG. 6 illustrates a flow chart of an example of a method 600 for providing MBS assistance information for cell reselection. In an example, a base station 102 can perform the functions described in method 600 using one or more of the components described in FIG. 1 or 3.

In method 600, at Block 602, the base station can receive, from a UE (e.g., UE 104), information regarding a UE interested MBS. In an aspect, MBS continuity component 354, e.g., in conjunction with processor(s) 312, memory 316, transceiver 302, scheduling component 342, etc., can receive, from the UE, the information regarding the UE interested MBS. For example, the UE 104 may send a request for information of cells that support the UE interested MBS, where the request can indicate the UE interested MBS (e.g., based on desired MB-flow/TMGI/MB-Session ID/MB SAI, etc.), or the UE interested MBS may be inferred from previous MBS communications provided to the UE 104, etc. In one example, as described, MBS continuity component 354 may receive the request in a RACH message (e.g., MsgA in two-step RACH, Msg1 in four-step RACH, etc.).

In method 600, at Block 604, the base station can determine one or more neighboring cells offering the UE interested MBS. In an aspect, MBS continuity component 354, e.g., in conjunction with processor(s) 312, memory 316, transceiver 302, scheduling component 342, etc., can determine one or more neighboring cells offering the UE interested MBS. For example, MBS continuity component 354 can determine the one or more neighboring cells based on information exchanged between cells regarding supported MBSs, information received from other UEs that communicate with the one or more neighboring cells regarding supported MBSs, etc.

In method 600, at Block 606, the base station can transmit, to the UE, an indication of the one or more neighboring cells. In an aspect, MBS continuity component 354, e.g., in conjunction with processor(s) 312, memory 316, transceiver 302, scheduling component 342, etc., can transmit, to the UE, the indication of the one or more neighboring cells. For example, the indication may identify the neighboring cells, may include information regarding the MBSs supported by the neighboring cells (e.g., identifiers, frequencies, numerologies, bandwidths, etc.). In addition, MBS continuity component can transmit the indication in MCCH, SIB, RACH message (e.g., MsgB in two-step RACH, Msg2 in four-step RACH, etc.). Moreover, in an example, MBS continuity component 354 can determine the one or more neighboring cells and/or transmit the indication in various signaling and/or based on various considerations described above. For example, MBS continuity component 354 can transmit the indication in SIB signaling, in RRC signaling, such as connection release based on the UE transitioning to idle or inactive mode, in a MAC-CE, etc.

In method 600, optionally at Block 608, the base station can associate the indication of the one or more neighboring cells with a group RNTI (G-RNTI) for UE interested MBS. In an aspect, MBS continuity component 354, e.g., in conjunction with processor(s) 312, memory 316, transceiver 302, scheduling component 342, etc., can associate the indication of the one or more neighboring cells with the G-RNTI (e.g., a dedicated G-RNTI over an MCCH for MBS configuration information). Accordingly, the UE 104 can monitor the MCCH for the G-RNTI, and can obtain the MBS configuration information based on the G-RNTI. As described above, the UE 104 can use the indication (e.g., MBS configuration information) in determining cells for reselection in an attempt to continue using the MBS.

Figure 7:
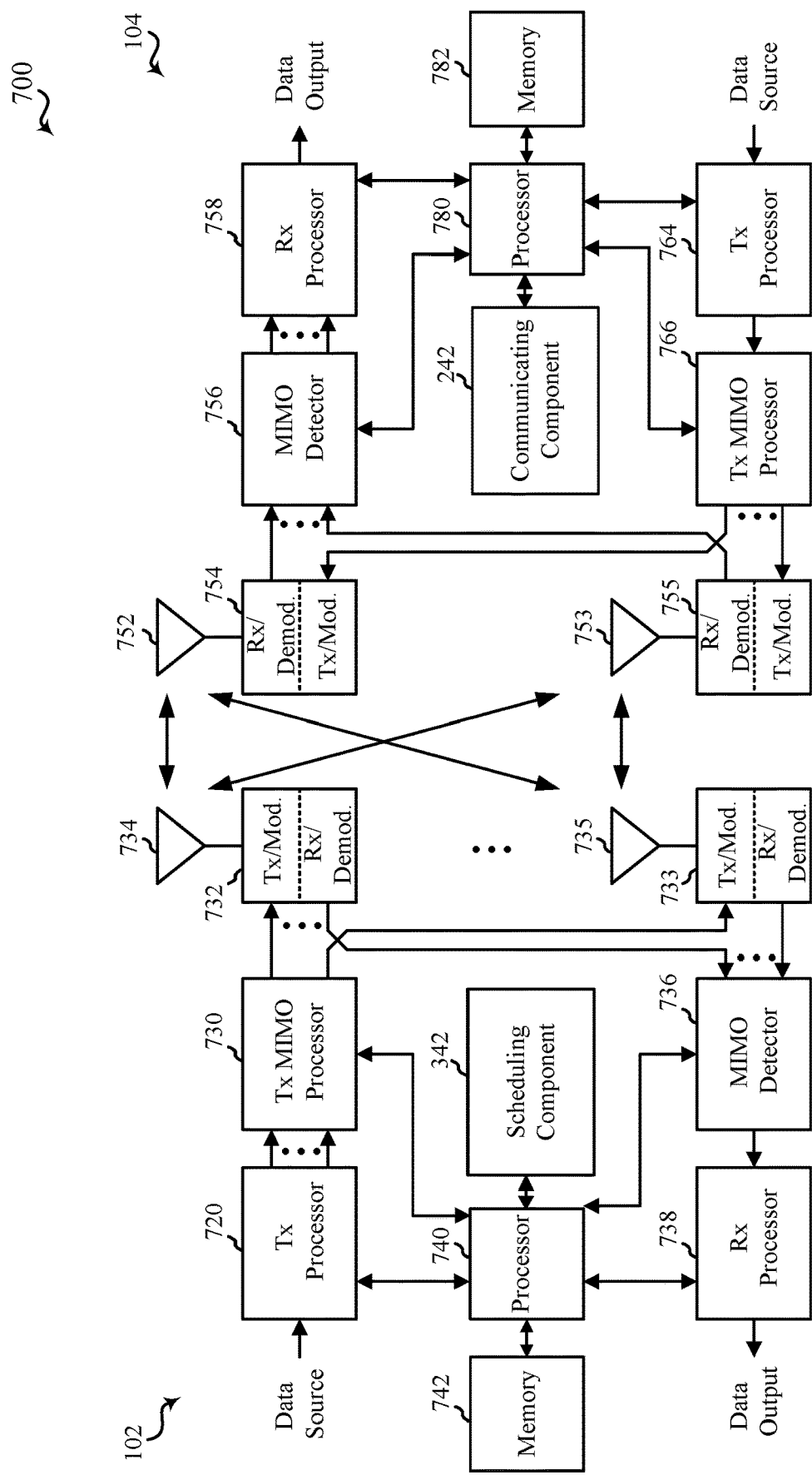
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including detecting one or more cells for reselection from a current cell, wherein the current cell supports a UE interested MBS, evaluating the one or more cells for reselection based at least in part on whether the one or more cells support the UE interested MBS to determine a target cell for reselection, and performing cell reselection to the target cell.

In Aspect 2, the method of Aspect 1 includes determining whether the one or more cells support the UE interested MBS based at least in part on receiving, from at least one cell of the one or more cells, system information advertising MBS for the cell or for one or more additional cells.

In Aspect 3, the method of Aspect 2 includes wherein the system information indicates one or more MBSs and associated frequencies over which the one or more MBSs are provided at the one or more cells.

In Aspect 4, the method of Aspect 3 includes wherein evaluating the one or more cells comprises determining a serving frequency of the associated frequencies over which the UE interested MBS is provided by the one or more cells, and wherein performing the reselection comprises switching to the serving frequency of the target cell.

In Aspect 5, the method of any of Aspects 1 to 4 includes determining whether the one or more cells support the UE interested MBS based at least in part on a multicast control channel stored from the one or more cells.

In Aspect 6, the method of any of Aspects 1 to 5 includes determining whether the one or more cells support the UE interested MBS based at least in part on system information or a multicast control channel received for the one or more cells, wherein the system information or the multicast control channel indicates whether a multicast radio bearer for the UE interested MBS is active.

In Aspect 7, the method of any of Aspects 1 to 6 includes determining whether the one or more cells support the UE interested MBS based at least in part on information received from the UE interested MBS application or service layer.

In Aspect 8, the method of any of Aspects 1 to 7 includes determining whether the one or more cells support the UE interested MBS based at least in part on receiving information of the one or more cells in a connection release message from the current cell.

In Aspect 9, the method of any of Aspects 1 to 8 includes wherein evaluating the one or more cells comprises ranking the one or more cells for reselection using, for each of the one or more cells, a bias value associated with whether the one or more cells support the UE interested MBS.

In Aspect 10, the method of Aspect 9 includes wherein ranking the one or more cells is further based at least in part on, for each of the one or more cells, a measurement value for signals received from the one or more cells and a hysteresis value for cell reselection.

In Aspect 11, the method of any of Aspects 9 or 10 includes wherein the bias value is associate with whether the one or more cells support a specific TMGI ID, MB-flow ID, MB SAI, or MB-Session ID.

In Aspect 12, the method of any of Aspects 1 to 11 includes transmitting, to the current cell, a request for the one or more cells supporting the UE interested MBS, wherein detecting the one or more cells for reselection is based on receiving, based on the request, an indication of the one or more cells from the current cell.

In Aspect 13, the method of Aspect 12 includes wherein the request indicates one or of a TMGI ID, MB-flow ID, MB SAI, or MB-Session ID indicating the UE interested MBS, and wherein the indication is received in a multicast control channel or system information from the current cell.

In Aspect 14, the method of any of Aspects 12 or 13 includes wherein the indication is received based on a group radio network temporary identifier for UE interested MBS.

In Aspect 15, the method of any of Aspects 1 to 14 includes determining whether a MRB is available at the target cell, and where the MRB is available, receiving the UE interested MBS via the MRB.

In Aspect 16, the method of Aspect 15 includes where the MRB is not available, determining whether a MBS bearer context for the UE interested MBS is configured in the target cell, and where the MBS bearer context is available, requesting setup of the MRB in the target cell for receiving the UE interested MBS.

In Aspect 17, the method of Aspect 16 includes where the MBS bearer context is not available, request the UE interested MBS via non-access stratum request in the target cell, where the request is successful, establishing the MRB in the target cell for receiving the UE interested MBS.

In Aspect 18, the method of Aspect 17 includes wherein where the request is unsuccessful, establishing a unicast flow with the target cell to receive the UE interested MBS.

Aspect 19 is a method for wireless communication including receiving, from a UE, information regarding a UE interested MBS, determining one or more neighboring cells offering the UE interested MBS, and transmitting, to the UE, an indication of the one or more neighboring cells.

In Aspect 20, the method of Aspect 19 includes associating the indication with a group radio network temporary identifier for UE interested MBS.

Aspect 21 is an apparatus for wireless communication including a transceiver, a memory configured to store instructions, and one or more processors communicatively coupled with the memory and the transceiver, wherein the one or more processors are configured to perform one or more of the methods of any of Aspects 1 to 20.

Aspect 22 is an apparatus for wireless communication including means for performing one or more of the methods of any of Aspects 1 to 20.

Aspect 23 is a computer-readable medium including code executable by one or more processors for wireless communications, the code including code for performing one or more of the methods of any of Aspects 1 to 20.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving, from a current cell, system information advertising, for at least one cell of one or more other cells, multiple multicast and/or broadcast service (MBS) identifiers of multiple MBSs provided by the at least one cell, an indication of a first frequency over which the at least one cell provides a first one of the multiple MBSs, and an indication of a second frequency over which the at least one cell provides a second one of the multiple MBSs;
   detecting one or more cells, including at least a portion of the one or more other cells, for idle-mode cell reselection from a current cell;
   evaluating at least the portion of the one or more other cells for idle-mode cell reselection including determining, based on the system information, a target cell of the one or more other cells that provides a UE interested MBS and a frequency over which the target cell provides the MBS; and
   performing idle-mode cell reselection to the target cell including switching from a serving frequency to the frequency over which the target cell provides the MBS.

2. The method of claim 1, further comprising determining whether the one or more other cells support the UE interested MBS based at least in part on an indication stored from a multicast control channel from the one or more other cells.

3. The method of claim 1, further comprising determining whether the one or more other cells support the UE interested MBS based at least in part on additional system information or a multicast control channel received for the one or more other cells, wherein the additional system information or the multicast control channel indicates whether a multicast radio bearer for the UE interested MBS is active.

4. The method of claim 1, further comprising determining whether the one or more other cells support the UE interested MBS based at least in part on information received from an application or service layer of the UE interested MBS.

5. The method of claim 1, further comprising determining whether the one or more other cells support the UE interested MBS based at least in part on receiving information of the one or more other cells in a connection release message from the current cell.

6. The method of claim 1, wherein evaluating at least the portion of the one or more other cells comprises ranking at least the portion of the one or more other cells for reselection using, for each of at least the portion of the one or more other cells, a bias value associated with whether at least the portion of the one or more other cells support the UE interested MBS.

7. The method of claim 6, wherein ranking at least the portion of the one or more other cells is further based at least in part on, for each of at least the portion of the one or more other cells, a measurement value for signals received from at least the portion of the one or more other cells and a hysteresis value for cell reselection.

8. The method of claim 6, wherein the bias value is associated with whether at least the portion of the one or more other cells support a specific temporary mobile group identity (TMGI), multicast and/or broadcast (MB) flow identifier, MB service area identifier (SAI), or MBS-Session identifier.

9. The method of claim 1, further comprising transmitting, to the current cell, a request for at least the portion of the one or more other cells supporting the UE interested MBS, wherein detecting the one or more cells for reselection is based on receiving, based on the request, an indication of at least the portion of the one or more other cells from the current cell.

10. The method of claim 9, wherein the request indicates one or more of a temporary mobile group identity (TMGI), multicast and/or broadcast (MB) flow identifier, MB service area identifier (SAI), or MBS-Session identifier indicating the UE interested MBS, and wherein the indication is received in a multicast control channel or system information from the current cell.

11. The method of claim 9, wherein the indication is received based on a group radio network temporary identifier for UE interested MBS.

12. The method of claim 1, further comprising:
   determining whether a multicast radio bearer (MRB) is available at the target cell; and
   where the MRB is available, receiving the UE interested MBS via the MRB.

13. The method of claim 12, further comprising:
   where the MRB is not available, determining whether a MBS bearer context for the UE interested MBS is configured in the target cell; and
   where the MBS bearer context is available, requesting setup of the MRB in the target cell for receiving the UE interested MBS.

14. The method of claim 13, further comprising:
where the MBS bearer context is not available, request the UE interested MBS via non-access stratum request in the target cell;
where the request is successful, establishing the MRB in the target cell for receiving the UE interested MBS.

15. The method of claim 14, wherein where the request is unsuccessful, establishing a unicast flow with the target cell to receive the UE interested MBS.

16. A method for wireless communication, comprising:
receiving, from a user equipment (UE), information regarding a UE interested multicast and/or broadcast service (MBS);
determining, based on the information, one or more neighboring cells offering multiple MBSs including the UE interested MBS; and
transmitting, to the UE, an indication of the one or more neighboring cells.

17. The method of claim 16, further comprising associating the indication with a group radio network temporary identifier for UE interested MBS.

18. An apparatus for wireless communication, comprising:
a transceiver;
a memory configured to store instructions; and
one or more processors communicatively coupled with the memory and the transceiver, wherein the one or more processors are configured to:
receive, from a current cell, system information advertising, for at least one cell of one or more other cells, multiple multicast and/or broadcast service (MBS) identifiers of multiple MBSs provided by the at least one cell, an indication of a first frequency over which the at least one cell provides a first one of the multiple MBSs, and an indication of a second frequency over which the at least one cell provides a second one of the multiple MBSs;
detect one or more cells, including at least a portion of the one or more other cells, for idle-mode cell reselection from a current cell, wherein the current cell supports a user equipment (UE) interested multicast and/or broadcast service (MBS);
evaluate at least a portion of the one or more other cells for idle-mode cell reselection including determining, based on the system information, a target cell of the one or more other cells that provides a UE interested MBS and the frequency over which the target cell provides the MBS; and
perform idle-mode cell reselection to the target cell including switching from a serving frequency to the frequency over which the target cell provides the MBS.

19. The apparatus of claim 18, wherein the one or more processors are further configured to determine whether the one or more other cells support the UE interested MBS based at least in part on an indication stored from a multicast control channel from the one or more other cells.

20. The apparatus of claim 18, wherein the one or more processors are further configured to determine whether the one or more other cells support the UE interested MBS based at least in part on additional system information or a multicast control channel received for the one or more other cells, wherein the additional system information or the multicast control channel indicates whether a multicast radio bearer for the UE interested MBS is active.

21. The apparatus of claim 18, wherein the one or more processors are further configured to determine whether the one or more other cells support the UE interested MBS based at least in part on information received from an application or service layer of the UE interested MBS.

22. The apparatus of claim 18, wherein the one or more processors are further configured to determine whether the one or more other cells support the UE interested MBS based at least in part on receiving information of the one or more cells in a connection release message from the current cell.

23. An apparatus for wireless communication, comprising:
a transceiver;
a memory configured to store instructions; and
one or more processors communicatively coupled with the memory and the transceiver, wherein the one or more processors are configured to:
receive, from a user equipment (UE), information regarding a UE interested multicast and/or broadcast service (MBS);
determine, based on the information, one or more neighboring cells offering multiple MBSs including the UE interested MBS; and
transmit, to the UE, an indication of the one or more neighboring cells.

24. The apparatus of claim 23, wherein the one or more processors are further configured to associate the indication with a group radio network temporary identifier for UE interested MBS.

25. The apparatus of claim 18, wherein the one or more processors are configured to evaluate at least the portion of the one or more other cells comprises ranking at least the portion of the one or more other cells for reselection using, for each of at least the portion of the one or more other cells, a bias value associated with whether at least the portion of the one or more other cells support the UE interested MBS.

26. The apparatus of claim 25, wherein the one or more processors are configured to rank at least the portion of the one or more other cells is further based at least in part on, for each of at least the portion of the one or more other cells, a measurement value for signals received from at least the portion of the one or more other cells and a hysteresis value for cell reselection.

27. The apparatus of claim 25, wherein the bias value is associated with whether at least the portion of the one or more other cells support a specific temporary mobile group identity (TMGI), multicast and/or broadcast (MB) flow identifier, MB service area identifier (SAI), or MBS-Session identifier.

28. The apparatus of claim 18, wherein the one or more processors are further configured to transmit, to the current cell, a request for at least the portion of the one or more other cells supporting the UE interested MBS, wherein detecting the one or more cells for reselection is based on receiving, based on the request, an indication of at least the portion of the one or more other cells from the current cell.

29. The apparatus of claim 28, wherein the request indicates one or more of a temporary mobile group identity (TMGI), multicast and/or broadcast (MB) flow identifier, MB service area identifier (SAI), or MBS-Session identifier indicating the UE interested MBS, and wherein the indication is received in a multicast control channel or system information from the current cell.

30. The apparatus of claim 18, wherein the one or more processors are further configured to:
determine whether a multicast radio bearer (MRB) is available at the target cell; and where the MRB is available, receive the UE interested MBS via the MRB.

\* \* \* \* \*